United States Patent
Lee

(10) Patent No.: US 12,300,004 B2
(45) Date of Patent: May 13, 2025

(54) VEHICLE PATH RESTORATION SYSTEM THROUGH SEQUENTIAL IMAGE ANALYSIS AND VEHICLE PATH RESTORATION METHOD USING THE SAME

(71) Applicant: CARVI INC., Seoul (KR)

(72) Inventor: Eunsu Lee, Seoul (KR)

(73) Assignee: CARVI INC., Seoul (KR)

( * ) Notice: Subject to any disclaimer, the term of this patent is extended or adjusted under 35 U.S.C. 154(b) by 351 days.

(21) Appl. No.: 17/805,124

(22) Filed: Jun. 2, 2022

(65) Prior Publication Data

US 2023/0230391 A1 Jul. 20, 2023

(30) Foreign Application Priority Data

Jan. 14, 2022 (KR) .......................... 10-2022-0005776

(51) Int. Cl.
*G06V 20/56* (2022.01)
*G06T 7/246* (2017.01)

(52) U.S. Cl.
CPC ............ *G06V 20/588* (2022.01); *G06T 7/248* (2017.01); *G06T 2207/10016* (2013.01); *G06T 2207/30241* (2013.01); *G06T 2207/30244* (2013.01); *G06T 2207/30256* (2013.01)

(58) Field of Classification Search
None
See application file for complete search history.

(56) References Cited

U.S. PATENT DOCUMENTS 12,182,878 B2 * 12/2024 Shalev-Shwartz .... B60W 10/18
2003/0156015 A1 * 8/2003 Winner ........... B60W 30/18145
340/425.5

(Continued)

FOREIGN PATENT DOCUMENTS

KR 10-1342124 B1 12/2013
KR 10-1455835 B1 11/2014

(Continued)

OTHER PUBLICATIONS

Non-Final Office Action for KR10-2022-0005776 by Korean Intellectual Property Office dated Apr. 21, 2022.

*Primary Examiner* — Randolph I Chu
(74) *Attorney, Agent, or Firm* — BROADVIEW IP LAW, PC

(57) ABSTRACT

Disclosed are a vehicle path restoration system through sequential image analysis which includes: an image capturing unit that acquires sequential images from the front camera installed in the subject vehicle; an image analysis unit for generating multiple lanes that can be recognized from the sequential images of the video file acquired by the image capturing unit and multi-paths calculated using the geometric characteristics of the lanes recognized at the current time and the speed of the subject vehicle, that restores the path of the subject vehicle and restores the path of the front vehicle driving in front of the subject vehicle; a memory for storing path data of the subject vehicle and the front vehicle restored by the image analysis unit; and a display unit that expresses the path data of the subject vehicle and the front vehicle stored in the memory in the form of a top view.

8 Claims, 13 Drawing Sheets

(56) References Cited

U.S. PATENT DOCUMENTS

| | | | |
|---|---|---|---|
| 2015/0120138 A1* | 4/2015 | Zeng | G01S 13/931 |
| | | | 701/41 |
| 2016/0110623 A1* | 4/2016 | Kim | G06T 7/246 |
| | | | 382/103 |
| 2018/0189577 A1* | 7/2018 | Yoo | G06T 7/593 |
| 2019/0251373 A1* | 8/2019 | Lee | G08G 1/167 |
| 2019/0251845 A1* | 8/2019 | Kosaka | G06V 20/588 |
| 2019/0347493 A1* | 11/2019 | Chen | G01C 21/3815 |
| 2020/0057450 A1* | 2/2020 | Calleija | G06V 20/588 |
| 2020/0160069 A1* | 5/2020 | Sathyanarayana | G06V 20/588 |
| 2020/0234063 A1* | 7/2020 | Min | G06T 7/70 |
| 2020/0249685 A1* | 8/2020 | Elluswamy | G05D 1/0231 |
| 2022/0001872 A1* | 1/2022 | Taieb | B60W 60/0011 |
| 2022/0076453 A1* | 3/2022 | Sakano | H04N 17/002 |
| 2022/0207276 A1* | 6/2022 | Lee | G06V 10/44 |
| 2022/0284713 A1* | 9/2022 | Rishi | G06F 18/22 |
| 2023/0029533 A1* | 2/2023 | Kim | B60W 50/14 |
| 2024/0025412 A1* | 1/2024 | Zhang | B60W 40/02 |
| 2024/0208547 A1* | 6/2024 | Yang | B60W 60/0027 |

FOREIGN PATENT DOCUMENTS

| | | |
|---|---|---|
| KR | 10-1473866 B1 | 12/2014 |
| KR | 10-2018-0063524 A | 6/2018 |
| KR | 10-2296520 B1 | 9/2021 |
| KR | 10-2318586 B1 | 10/2021 |

\* cited by examiner

FIG. 18

| before changing a lane | after changing into a left lane |
|---|---|
| ③ | deleted |
| ② | ③ |
| ① | ② |
| ⓪ | ① |
| new lane | ⓪ |

FIG. 19

| before changing a lane | after changing into a right lane |
|---|---|
| ⓪ | deleted |
| ① | ⓪ |
| ② | ① |
| ③ | ② |
| new lane | ③ |

VEHICLE PATH RESTORATION SYSTEM THROUGH SEQUENTIAL IMAGE ANALYSIS AND VEHICLE PATH RESTORATION METHOD USING THE SAME

CROSS-REFERENCE TO RELATED APPLICATIONS

This application claims priority from Korean Patent Application No. 10-2022-0005776, filed on Jan. 14, 2022, in the Korean Intellectual Property Office, the disclosure of which is incorporated herein by reference in its entirety.

BACKGROUND OF THE INVENTION

Field of the Invention

The present invention relates to a vehicle path restoration system through sequential image analysis and a vehicle path restoration method using the same, and more specifically, a vehicle path restoration system and a vehicle path restoration method using the same which is expressed in a top view by restoring surrounding situations such as the moment of a traffic accident through sequential image (video) analysis.

Background Technology Description of the Related Art

In the case of a traffic accident, it is often very ambiguous to distinguish between the offender and the victim. Therefore, there is an ongoing dispute over who is the offender and who is the victim.

Recently, with the increase in the supply of automobiles and the increase in casualties due to accidents, black boxes that have been used for aviation are also being used in vehicles. A vehicle black box enables the cause of a traffic accident to be clearly determined by analyzing related data such as vehicle speed, direction, and brake operation.

Such a vehicle black box records the situation at the time of the accident with a camera installed on the front or rear of the vehicle, and stores all sounds around it with a microphone.

However, there is a problem in that it is difficult to accurately understand the path between the actual driving vehicle and the vehicle in front at a glance. That is, there is a need for a means to accurately determine the cause of the accident by restoring the entire path.

CITED REFERENCE

Patent Document (Patent Document 1) Korean Patent No. 10-1342124 (A Front Vehicle Detecting And Tracking System Using The Image And Detecting And Tracking Method Using The Same, Dec. 19, 2013)
(Patent Document 2) Korean Patent No. 10-1455835 (Lane Recognition and Tracking System Using Images, And Method For Recognition And Tracking Lane Using The Same, Nov. 4, 2014)
(Patent Document 3) Korean Patent No. 10-1473866 (IMAGE PROCESSING SYSTEM FOR VEHICLE AND IMAGE PROCESSING METHOD OF USING THE SAME, Dec. 17, 2014)
(Patent Document 4) Korean Patent No. 10-2296520 (METHOD OF DETECTING CURVED LANE THROUGH PATH ESTIMATION BY MONOCULAR VISION BASED CAMERA, Sep. 1, 2021)
(Patent Document 5) Korean Patent No. 10-2318586 (METHOD OF DETECTING MEDIAN STRIP AND PREDICTING COLLISION RISK THROUGH ANALYSIS OF IMAGES, Oct. 28, 2021)

SUMMARY OF THE INVENTION

The present invention has been devised in view of the above-described problems, and its purpose is to restore the surrounding conditions such as the moment of a traffic accident through sequential image analysis and express it in a top view. It is to provide a vehicle path restoration system through sequential image analysis and a vehicle path restoration method using the same.

The vehicle path restoration system through sequential image analysis of the present invention for solving the above problems includes: an image capturing unit that acquires sequential images from the front camera installed in the subject vehicle; an image analysis unit for generating multiple lanes that can be recognized from the sequential images of the video file acquired by the image capturing unit and multi-paths calculated using the geometric characteristics of the lanes recognized at the current time and the speed of the subject vehicle, that restores the path of the subject vehicle and restores the path of the front vehicle driving in front of the subject vehicle; a memory for storing path data of the subject vehicle and the front vehicle restored by the image analysis unit; and a display unit that expresses the path data of the subject vehicle and the front vehicle stored in the memory in the form of a top view.

Preferably, the multi paths are located by a plurality of indexes in a predefined memory space, so that it is possible to store path data even when the subject vehicle changes lanes left and right between the multi paths.

The vehicle path restoration method through sequential image analysis of the present invention for solving the above other problems includes: acquiring sequential images from a front camera of an image capturing unit installed in a subject vehicle; generating a path of a subject vehicle and a front vehicle by receiving the sequential image and performing image analysis in an image analysis unit; and expressing the image analysis of the image analysis unit in the form of a top view on the display unit; performing image analysis in the image analysis unit are: determining a lane of the current time; generating a multi-lane recognizable in the front camera image and a multi-path for each index calculated using geometric characteristics of the lane recognized at the current time and the speed of the subject vehicle; generating path data of the subject vehicle; and generating path data of the front vehicle.

Preferably, a path set of each index in the multi-path comprises receiving input information that is input data for creating a path set; determining whether the path is a curved line or a straight lane; generating a curved path when the path is determined as a curved lane, and generating a straight path when the path is determined as a straight lane; and creating a path set of the corresponding index by integrating the curved path and the straight path. The input data for creating the path set are the speed of the subject vehicle, the path index number, the equation coefficient of a straight line and the equation coefficient of the curve suitable for the lane recognized in the image, the radius of curvature, and the curve discrimination coefficient.

Preferably, the step of creating the multi-path for each index includes: determining an index of a path connected to the lane recognized in the current frame in the front camera image as an active path index, and determining an index of a path not connected to the lane recognized in the current frame in the front camera image as an inactive path index; the active path index is passed to the active multi-path to generate an active multi-path; and the inactive path index is transferred to the inactive multi-path, and in the inactive multi-path generation, a new path is not added, but according to the movement of the subject vehicle, correcting the location of the path stored in the past time. The active multi-path generation is the entire process of a method of creating a path set of each individual index, and the active single path generation step is performed several times as many as the number of lanes recognized in the current image.

Preferably, generating path data of the subject vehicle comprises: obtaining equation coefficients of straight lines and the equation coefficients of curve of a driving lane, which are both lanes of a subject vehicle; determining the equation coefficients of the straight line and the equation coefficients of curve for the path of the subject vehicle by using the equation coefficients of the straight line and the equation coefficients of the curve of the driving lane; determining whether the path is a curved line or a straight lane; generating a curved path when the path is determined as a curved lane, and generating a straight path when the path is determined as a straight lane; and generating a set of paths for the subject vehicle by integrating the curved path and the straight path.

Here, further comprising the step of making the driving lane in a parallel state: determining a lane probability variable that is a probability of being a lane with respect to a right lane and a left lane; when the difference between the left lane and the right lane probability variable is less than or equal to a predetermined error tolerance, obtaining a median value of the slope and curvature of the two lane information, and calculating the equations of straight lines and curves for the path with respect to the left and right lanes; comparing the sizes of the left lane and right lane probability variables when the difference between the left and right lane probability variables is out of a predetermined error tolerance; and if the right-lane probability variable is larger than the left-lane probability variable, calculate the equations of straight lines and curves for the left-lane path, such as the slope and curvature of the right-lane, Ii the right-lane probability variable is smaller than the left-lane probability variable, calculate the equations of straight lines and curves for the right-lane path, such as the slope and curvature of the left-lane.

Preferably, when the location of the multi-lane is changed because the subject vehicle is changed to a lane, the information of the multi-lane is moved together.

Preferably, generating of the path data of the front vehicle includes: determining a vector b representing that the front vehicle moves from a specific position of an image of a previous frame to a specific position of an image of a current frame when the camera coordinates of the subject vehicle are taken as the origin; determining a motion vector h of the subject vehicle connecting the current coordinates and the coordinates of the previous frame in the path of the subject vehicle; and obtaining a motion vector v of the front vehicle that is a vector addition of the vector b and the vector h.

According to the present invention having the configuration as described above, it is possible to express a top view by restoring surrounding situations such as the moment of a traffic accident through sequential image analysis.

In addition, it has various applications, such as determining the driver's driving habits and whether the front vehicle violates traffic laws by restoring the path between the subject vehicle and the front vehicle.

BRIEF DESCRIPTION OF THE DRAWING FIGURES

The above object and advantages of the present invention will become more apparent by describing in detail exemplary embodiments thereof with reference to the attached drawings in which:

FIGS. 18 and 19 are diagrams illustrating a method of moving multi-lane information when a subject vehicle changes lanes.

DETAILED DESCRIPTION OF THE EXEMPLARY EMBODIMENTS

Hereinafter, vehicle path restoration system through sequential image analysis and vehicle path restoration method using the same according to a preferred embodiment of the present invention will be described in detail with reference to the accompanying drawings.

Figure 1:
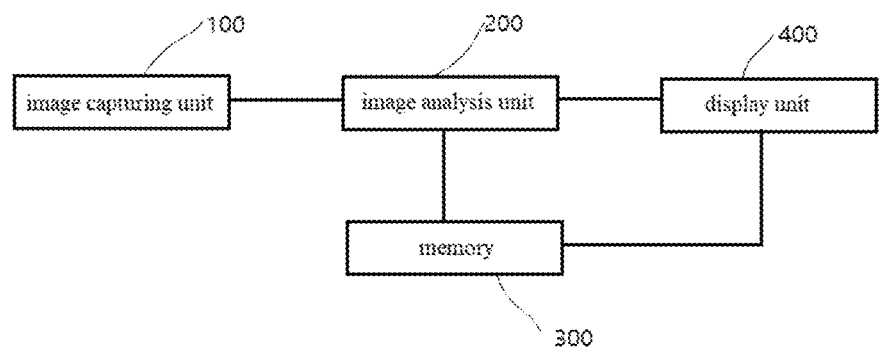
FIG. 1 is a diagram illustrating a vehicle path restoration system through sequential image analysis according to an embodiment of the present invention.

FIG. 1 is a diagram illustrating a vehicle path restoration system through sequential image analysis according to an embodiment of the present invention.

Referring to FIG. 1, sequential images are acquired by the image capturing unit 100 which is a front camera installed in a subject vehicle.

The image analysis unit 200 analyzes the sequential images of the video files obtained by the image capturing unit 100 to generate a multi-lane path and restore the path of the subject vehicle. In addition, the image analysis unit 200 restores the path of the front vehicle driving ahead.

The path data of the subject vehicle and the front vehicle is stored in the memory 300. It is stored with respect to the time frame of the sequential image.

Finally, the above data is expressed in the form of a top view on the display unit 400.

Figure 2:
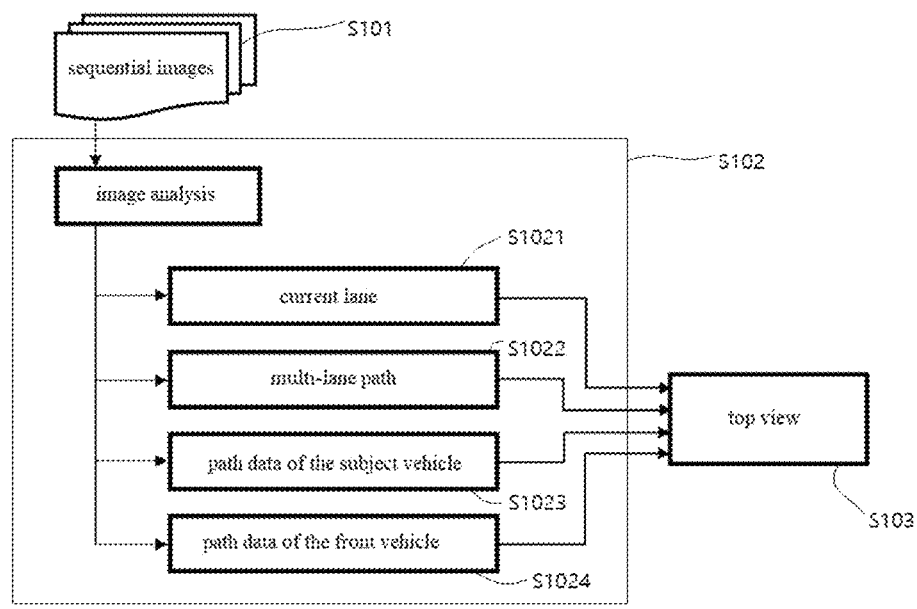
FIG. 2 is a flowchart illustrating a vehicle path restoration method through sequential image analysis according to an embodiment of the present invention.

FIG. 2 is a flowchart illustrating a vehicle path restoration method through sequential image analysis according to an embodiment of the present invention.

Referring to FIG. 2, sequential images are acquired from the front camera of the image capturing unit 100 installed in the subject vehicle (S101).

Next, the image analysis unit 200 performs image analysis by inputting sequential images (S102). The image analysis unit 200 includes technologies such as lane recognition, vehicle recognition, and object recognition.

First, a lane of the current time for displaying the top view is determined (S1021).

A multi-lane path is generated for each index by using information on various objects on the road obtained through image analysis (S1022).

A path data of the subject vehicle is formed through image analysis (S1023).

A path data of the front vehicles are generated through image analysis (S1024).

Next, the information obtained in S1021-S1024 is expressed in the form of a top view (S103).

Figure 3:
FIG. 3 is a view illustrating recognition of multiple lanes and a front vehicle in an input image according to an embodiment of the present invention.
Figure 4:
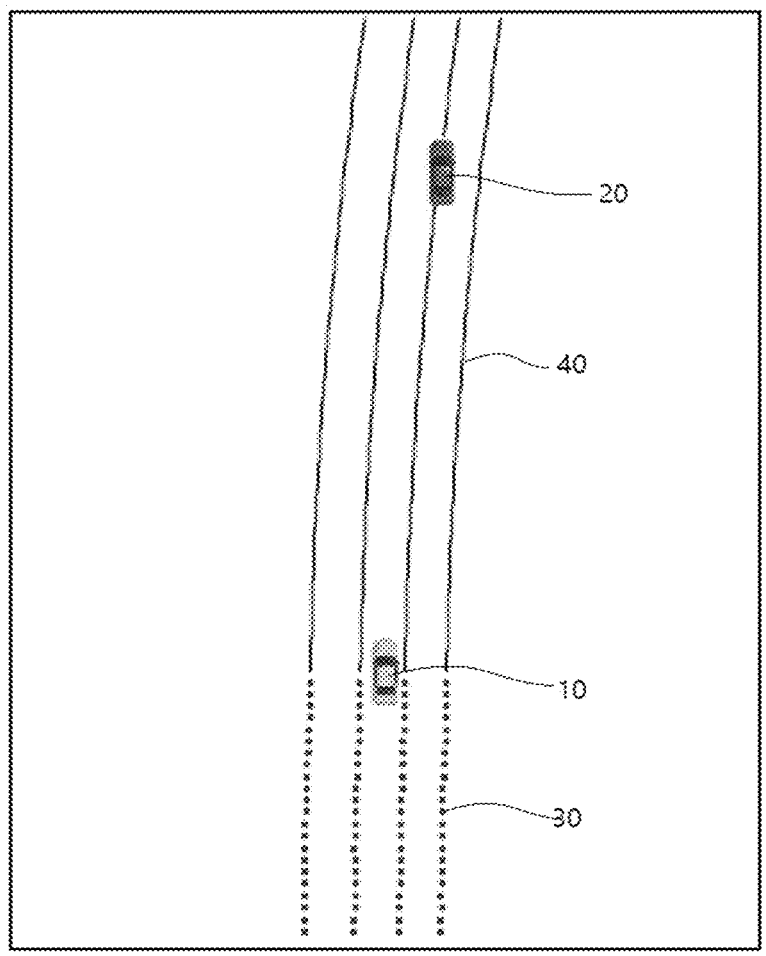
FIG. 4 is a diagram illustrating a top view made from an input image according to an embodiment of the present invention.

FIG. 3 is a view showing recognition of multiple lanes and a front vehicle in the input image according to an embodiment of the present invention, and FIG. 4 is a view showing a top view made from the input image according to an embodiment of the present invention.

Referring to FIG. 3, it shows recognition of multiple lanes and a front vehicle in an input image. This operation is repeated for sequential images, and a path data set is generated from the geometrical correlation of the recognized lanes. Once this data set and the lane data recognized in the current frame are combined and expressed in the world coordinate system, a top view as shown in FIG. 4 can be created.

Referring to FIG. 4, the four solid lines on the upper part mean that four multi-lanes are recognized as curves in the image (FIG. 3) of the current frame, and the four dotted lines represent the four multi-paths generated in previous time frames.

In addition, the vehicle picture located between the solid line and the dotted line shows the location of the subject vehicle 10 in which the camera is installed. The vehicle picture displayed on the upper end of the subject vehicle 10 shows the position of the front vehicle 20 (boundary box) detected in FIG. 3.

The present invention analyzes the video in real time, and aims to show a lot of information at the moment of the accident. Therefore, the past multi-path 30 and the forward multi-lane 40 recognized at the present time are shown together.

(Multi-Lane and Multi-Path Structure)

Hereinafter, the structures of the multi-lane 40 and the multi-path 30 will be described.

The multi-lane 40 means a lane recognizable in the front camera image, for example 4 lanes in FIGS. 3 and 4.

Figure 5:
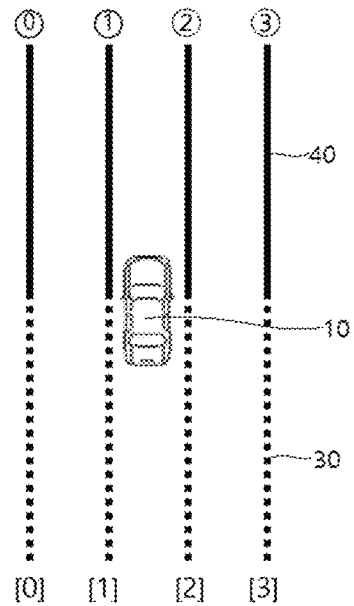
FIG. 5 is a diagram illustrating a multi-lane and multi-path according to an embodiment of the present invention.

FIG. 5 is a diagram illustrating a multi-lane and multi-path according to an embodiment of the present invention.

Referring to FIG. 5, as a basic view of the multi-lane 40 and the multi-path 30, the picture of the vehicle in the center means the subject vehicle 10 in which the camera is installed. The four straight lines in the upper part mean the multi-lane 40 recognized in the current image.

The circular number (⓪①②③) shows that a number is assigned to each multi-lane 40.

The lanes ① and ② mean the left and right lanes recognized from the left and right sides of the subject vehicle 10, and these are called driving lanes.

Lane ⓪ and ③ are lanes recognized from the left and right sides of the driving lane and are called extended lanes.

In addition, four dotted lines ([0][1][2][3]) existing under the subject vehicle 10 mean the multi-path 30. Here, the past multi-path is calculated using the geometrical characteristics of the lane recognized at the present time and the speed of the subject vehicle.

For example, if the lane ① in the path [1] is a straight line, the predicted path can be calculated using the vehicle speed and the linear function. If the lane ① in the path [1] is a curve, the expected path can be calculated using the vehicle speed, the movement vector using the inscribed circle of the parabola, and the correction of the entire path etc. A detailed description of obtaining a movement path of a curved lane is disclosed in Korean Patent Registration No. 10-2296520 (corresponding U.S. patent application Ser. No. 17/159,150) of the present applicant.

FIG. 5 is an example illustrating a state in which a subject vehicle travels without changing a lane. In an actual driving environment, since the subject vehicle changes lanes, n lane paths may exist. In the actual invention implementation process, the number of paths is limited due to limitations in the amount of computation and memory.

Figure 6:
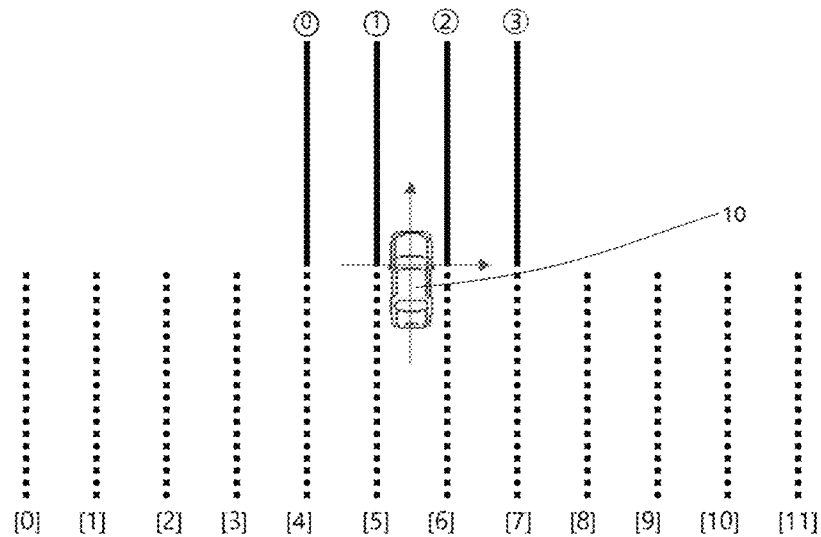
FIG. 6 is a diagram illustrating a case in which paths are expanded to 12 paths according to an embodiment of the present invention.

FIG. 6 is a diagram illustrating a case in which paths are expanded to 12 according to an embodiment of the present invention.

Referring to FIG. 6, as a case in which 12 paths are expressed, the 12 paths ([0] to [11]) are located in a memory space predefined for recording the paths of lanes existing in the sequential image.

The orthogonal coordinate system displayed on the picture of the subject vehicle in FIG. 6 means a coordinate system of a multi-lane and multi-path and is a world coordinate system having the position of the camera installed in the subject vehicle 10 as an origin. The subject vehicle 10 may move left and right between these paths. In FIG. 6, the subject vehicle 10 currently located in the center can store path data even when changing lanes 5 times to the left and right, respectively.

Figure 7:
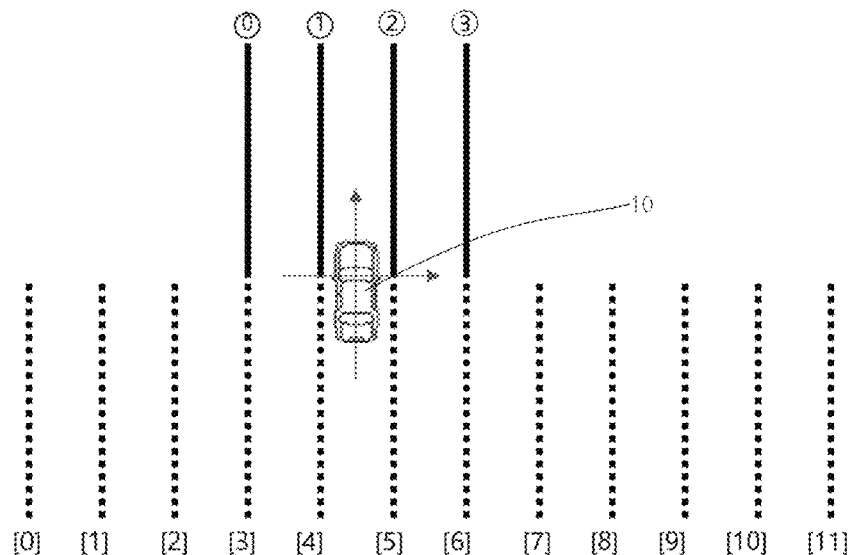
FIG. 7 is a view after changing one lane to the left in FIG. 6 according to an embodiment of the present invention.

FIG. 7 is a view after changing one lane to the left in FIG. 6 according to an embodiment of the present invention.

Referring to FIG. 7, the multi-lane structure (⓪①②③) has moved one step to the left from the location of the previous path ([4][5][6][7]) to ([3][4][5][6]).

In the present invention, a path set is formed for each multi-path index [0] to [11].

Figure 8:
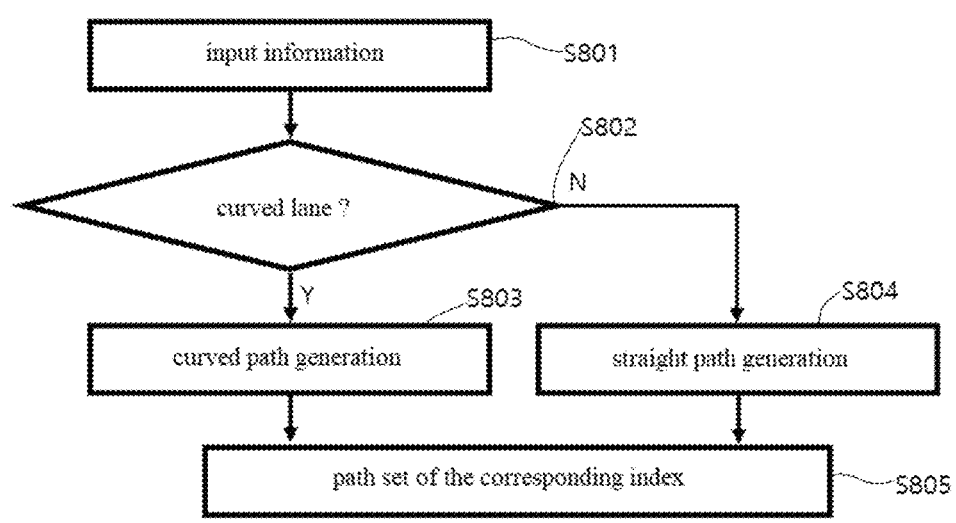
FIG. 8 is a flowchart illustrating a method of creating one path set in the image analysis unit according to an embodiment of the present invention.

FIG. 8 is a flowchart illustrating a method of creating one path set in the image analysis unit 200 according to an embodiment of the present invention.

Referring to FIG. 8, the image analysis unit 200 receives input information (S801).

The input information is input data for creating a path set. Specifically, the input data includes the speed of the subject vehicle, the path index number ([0] to [11] in FIG. 6), the equation coefficients of a straight line (a, b) and the equation coefficients of the curve (c, d, e) suitable for the lane recognized in the image, radius of curvature, curve discriminant coefficient, etc. The curve discriminant coefficient is a variable that is set to 0 if the lane recognized in the image is a straight line, and set to 1 if it is a curved line.

Next, it is determined whether it is a curved or straight lane (S802). It is a conditional statement that divides into the next step according to the value of the curve discriminant coefficient.

The method to obtain the curve discriminant coefficient is as follows. For the skeleton coordinates constituting the lane, fit the equation of a straight line or curve using the least squares method. In this case, the shortest distance $d_S$ between the coordinates of the skeleton and the equation of the straight line can be obtained. This shortest distance can be obtained for the number N of all skeleton coordinates, and the average value can be obtained.

By applying the above contents, it can be expressed as in Equation 1, $\mu_S$ and can be called an error rate of a straight line with respect to a lane.

$$\mu_S = \frac{1}{N}\sum d_S \qquad \text{[Equation 1]}$$

Similarly to the above method, the shortest distance $d_c$ between the skeleton coordinates and the equation of the curve is obtained. This shortest distance can be obtained for the number N of all skeleton coordinates, and the average value can be obtained. By applying the above contents, it can be expressed as in Equation 2, and $\mu_c$ can be called the error rate of the curve with respect to the lane.

$$\mu_C = \frac{1}{N}\sum d_C \qquad \text{[Equation 2]}$$

If the error rate of the straight line is smaller than the error rate of the curve, the curve discriminant coefficient is set to 0, and if the error rate of the straight line is greater than the error rate of the curve, the curve discriminant coefficient is set to 1.

Next, when it is determined as a curved lane, a curved path is generated (S803). A method of generating a curved path is disclosed in Korean Patent Registration No. 10-2296520 (corresponding U.S. patent application Ser. No. 17/159,150) of the present applicant.

In addition, when it is determined as a straight lane, a straight path is generated (S804). A method of generating a straight path will be described later.

Next, a path set of the corresponding index is generated by integrating the above-described curved path and straight path (S805).

Figure 9:
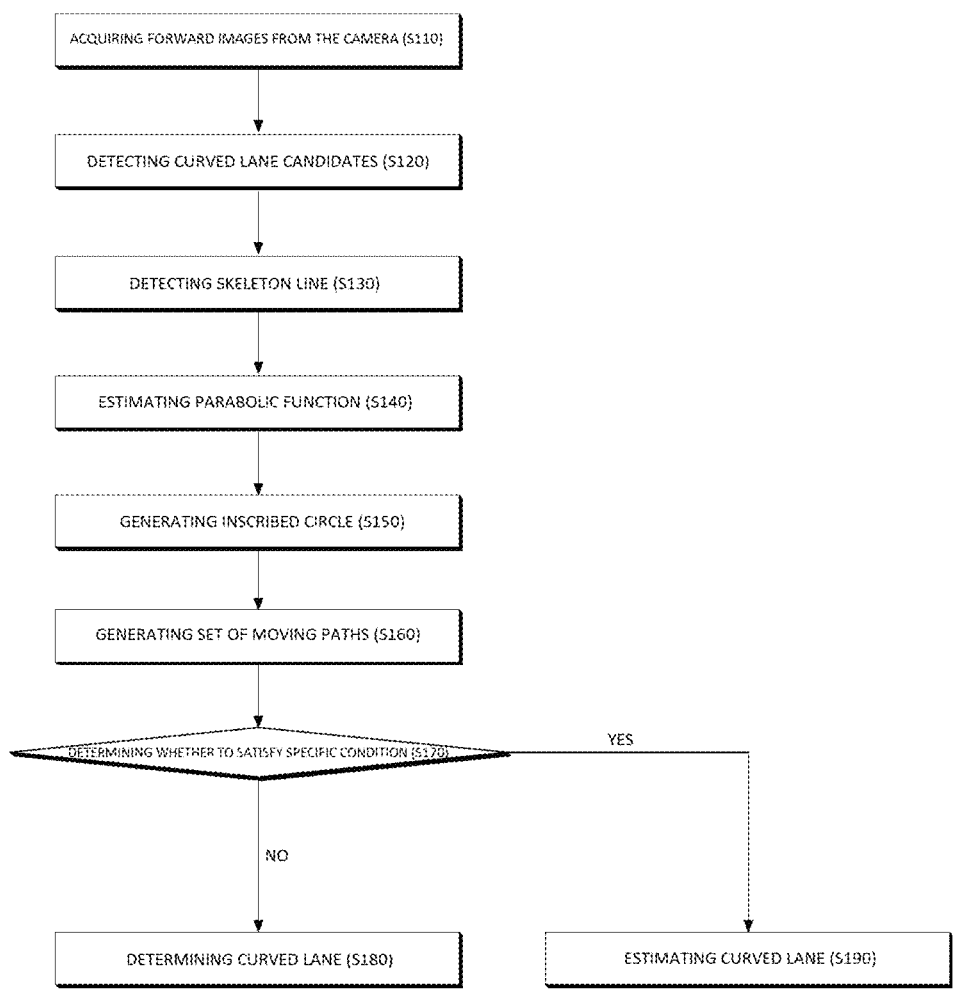
FIG. 9 is a diagram illustrating a method of generating a curved path according to an embodiment of the present invention.

FIG. 9 is a diagram illustrating a method of generating a curved path according to an embodiment of the present invention. Since the method for generating a curved path is disclosed in Korean Patent Registration No. 10-2296520 (corresponding U.S. patent application Ser. No. 17/159,150) of the present applicant, it will be briefly described.

Referring to FIG. 1, a method of detecting a curved lane includes acquiring forward images of a curved lane by using a monocular vision camera which captures the front from a vehicle, in operation S110, detecting curved lane candidates from the forward images, in operation S120, detecting a skeleton line having a thickness of 1 pixel by using a median value of the curved lane candidates, in operation S130, estimating a parabolic function which is curve-fitted by using the skeleton line, in operation S140, generating an inscribed circle inscribing in a parabola that corresponds to the parabolic function at a location where a world coordinate value Y is 0, in operation S150, generating a set of moving paths after anticipated coordinates of representative points in a current frame are calculated from coordinates of representative points which are tangent points of the parabola in a previous frame and the inscribed circle on the circumference of the inscribed circle, in operation S160, determining whether the skeleton line satisfies a specific condition for curve fitting in a current frame, in operation S170, when the skeleton line does not satisfy the specific condition, determining the parabola that fits the skeleton line as a curved lane, in operation S180, and when the skeleton line satisfies the specific condition, estimating the parabola which is curve-fitted to all skeleton line and set of the moving paths as a curved lane, in operation S190. Accordingly, the curved lane may be estimated by using the moving paths on the curved lane in the past.

Figure 10:
FIG. 10 is a diagram illustrating a method of generating a straight line path according to an embodiment of the present invention.

FIG. 10 is a diagram illustrating a method of generating a straight line path according to an embodiment of the present invention.

Referring to FIG. 10, $P_1=(X_0, Y_0)$ is a representative point of the current time at $Y_0=0$ with respect to the equation of the straight line Here, the representative point means coordinates that can represent the movement path of the lane on a straight line. $P_2=(X_E, Y_E)$ is the expected coordinates of the next time.

$$L_c = \sqrt{(X_0-X_E)^2+(Y_0-Y_E)^2} \qquad \text{[Equation 3]}$$

$$X_E = a+bY_E \qquad \text{[Equation 4]}$$

$L_S$ in Equation 3 means the Euclidean length of the vector $\overrightarrow{P_1P_0}$. Here, since the unknown is $(X_E, Y_E)$, by substituting Equation 4 into Equation 3, a quadratic equation (Equation 5) can be obtained.

$$(b^2+1)Y_E^2-2\{b(X_0-a)+Y_0\}Y_E+(X_0-a)^2+Y_0^2-L_S^2=0 \qquad \text{[Equation 5]}$$

Among the two values of $Y_E$ obtained in Equation 5, a negative number is selected and inputted in Equation 4 to obtain $X_E$. Through the above method, a path of a straight lane can be obtained.

Figure 11:
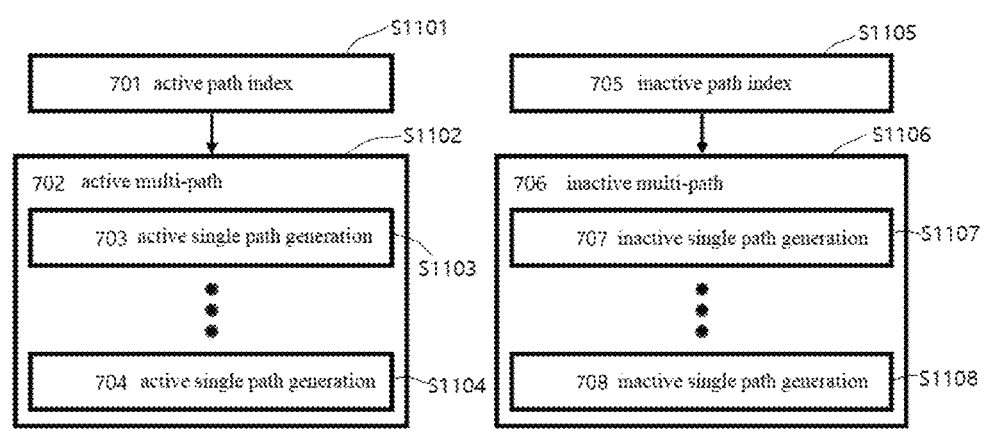
FIG. 11 is a diagram illustrating a process of forming a multi-path in an image analysis unit according to an embodiment of the present invention.

FIG. 11 is a diagram illustrating a process of forming a multi-path in the image analysis unit 200 according to an embodiment of the present invention.

Referring to FIG. 11, the index of the path connected to the lane recognized in the current frame is determined as the active path index (S1101), and the non-activated path is determined as the inactive path index (S1105).

What is important in the process of creating a multi-path is whether or not a lane is detected in the corresponding path. For example, in FIG. 6, there are 4 lanes detected in the image, which are connected to the path [4][5][6][7]. If this state is maintained, in the path index [4][5][6][7], new representative points are added to the path every frame, and a new path will be displayed on the screen of the top view. At this time, it is defined that the paths are activated.

The active path index is transferred to the active multi-path (S1102).

In the active multi-path, each active single path is generated (S1103, S1104). Here, each active single path generation (S1103, S1104) is the entire process of the method for creating the path set described in FIG. 8. That is, the active single path generation step is performed several times as many as the number of lanes recognized in the current image.

When the index of the path connected to the lane recognized in the current frame is determined as the inactive path index (S1105), it is transferred to the inactive multi-path (S1106). In the inactive single path generation (S1107, S1108), a new path is not added, but the location of the path stored in the past time is corrected according to the movement of the subject vehicle.

The remaining paths [0][1][2][3][8][9][10][11] other than the lane path [4][5][6][7] detected in FIG. 6 do not connect with the current lanes, so no new paths are added to the top view screen. At this time, it is defined that the paths are inactive. However, existing paths in the inactive paths are continuously modified according to the movement of the subject vehicle. Therefore, the step of generating the inactive multi-path (S1106) in FIG. 11 is also executed for every frame.

(How to Restore Multi-Lane to Parallel State)

A method is required to ensure that multiple lanes remain parallel.

If the result of lane recognition is used as it is for path generation, multi-lane paths cannot be maintained parallel to each other. For example, the slopes of the left and right lanes obtained by image recognition in a straight section cannot completely match. (See FIG. 3) When these data are used as path data as they are, the left and right paths may become closer or farther away from each other as time passes.

To solve the above problem, lane information for a path managed separately from lane information recognized as an image is generated. In the multi-lane case, both lanes of the subject vehicle as a reference are called driving lanes.

Although the average value of the information of the two driving lanes may be used, in this case, incorrect lane information may be input and an error of the path may occur.

Hereinafter, a method for reducing a path error will be described.

In order to create a driving lane in a parallel state, a reference lane must be selected among the two lanes. The reference lane may mean a lane having a higher probability of being the lane among the two lanes.

The probability that the data detected in the image is a lane is defined as a lane probability variable.

Figure 12:
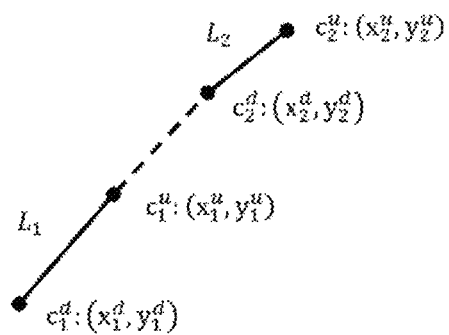
FIG. 12 is a diagram illustrating a lane probability variable according to an embodiment of the present invention.

FIG. 12 is a diagram for explaining a lane probability variable according to an embodiment of the present invention.

Referring to FIG. 12, a dotted line is geometrically expressed. The lower lane is $L_2$, and the upper lane is $L_2$. And, an empty section between these two lanes is expressed by a dotted line.

The lane probability variable of the present invention will be described.

The first probability is the ratio of the number of fitted skeleton line to the total number of skeleton line. A method of making a skeleton line is disclosed in Korean Patent Registration No. 10-2296520 (corresponding U.S. patent application Ser. No. 17/159,150) of the present applicant.

The first probability is about how long the lanes of the image look. This can be expressed as a mathematical expression as follows.

$$p_1 = \frac{n_s}{N} \qquad \text{[Equation 6]}$$

Here, N denotes the maximum length in which the lane skeleton line can exist in the image. $n_s$ means the length of the skeleton line of the lane detected in the current image.

The second probability relates to how close the $y_2^d$ value of the lower coordinate $c_1^d$ of the skeleton line $L_1$ is to the subject vehicle. This means that the closer the skeleton line is to the subject vehicle, the higher the probability of obtaining the correct lane.

Equation 7 shows how to obtain the probability $p_2$.

$$d = |y_1^d - y_0^d|$$

$$p_2 = \frac{1}{w \times d + 1} \qquad \text{[Equation 7]}$$

Here, $y_0^d$ means the Y-coordinate of the lowermost end of the image.

As the $y_1^d$ value of the dotted line is closer to the bottom of the image, the value of approaches 1, and as the $y_1^d$ value of the dotted line moves away from the bottom of the image, the value of $p_2$ approaches 0. w is a weight value for adjusting the probability value. For example, when $y_1^d$ exists at about 30 m, if you want to make probability $p_2$ 0.5, you can set w to 1/30.

The lane probability variable P for one lane means the joint probability of the probabilities $p_1$ and $p_2$.

Since the probabilities $p_1$ and $p_2$ and are independent events, they can be expressed by Equation 8.

$$P = p_1 \times p_2 \qquad \text{[Equation 8]}$$

Since the driving lane consists of left and right, the left lane random variable is $P_L$. and the right lane random variable is $P_R$.

The relationship between the two lane probability variables ($P_L$, $P_R$) can be defined in three ways.

The first relationship is when two lane probability variables have similar values. It can be expressed as a conditional expression as in Equation 9.

$$|P_L - P_R| < \theta \qquad \text{[Equation 9]}$$

In Equation 9, θ is the difference between the lane probability variables of the left and right lanes, and means an error tolerance value. For example, if θ is 0.2, if the difference between the lane probability variables of the left lane and the right lane has a value of 0.2 or less, it may be determined that they are similar.

The second relation is the case where $P_R$ is greater than $P_L$, and the third relation is the case where $P_R$ is less than $P_L$.

Figure 13:
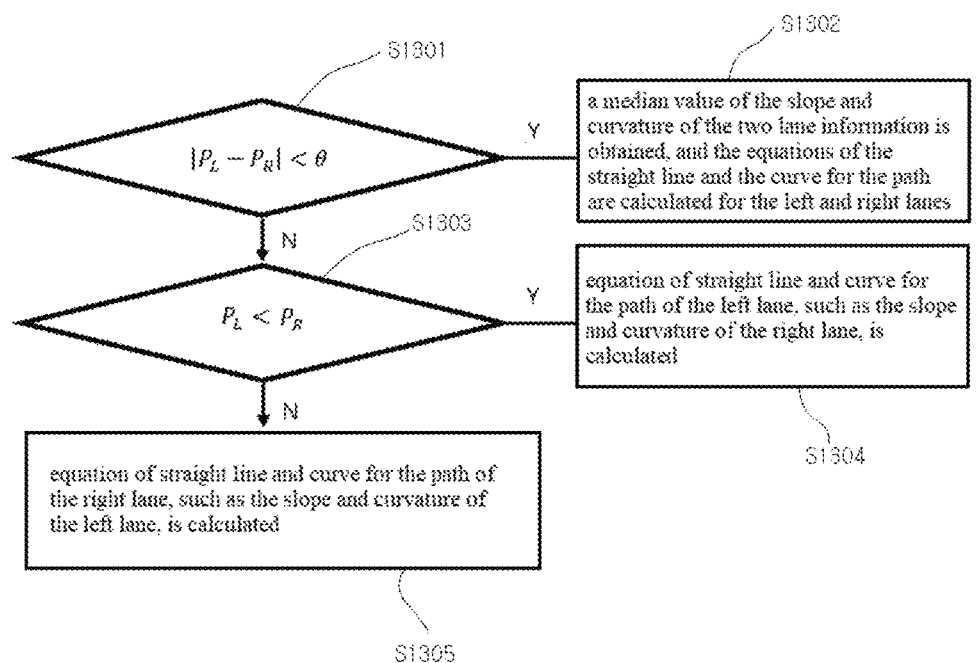
FIG. 13 is a diagram illustrating an algorithm for making driving lanes parallel to each other using probability variables ($P_L$, $P_R$) according to an embodiment of the present invention.

FIG. 13 is a diagram illustrating an algorithm for making driving lanes parallel to each other using lane probability variables ($P_L$, $P_R$) according to an embodiment of the present invention.

Referring to FIG. 13, it is determined whether the difference between the lane probability variables of the left lane and the right lane, which is the condition of Equation 9, is equal to or less than θ(S1301).

If Equation 9 is satisfied, a median value of the slope and curvature of the two lane information is obtained, and the equations of the straight line and the curve for the path are calculated for the left and right lanes (S1302).

If Equation 9 is not satisfied, the values of $P_L$, and $P_R$ are compared (S1303).

When $P_R$, is greater than $P_L$, the equation of straight line and curve for the path of the left lane, such as the slope and curvature of the right lane, is calculated (S1304).

When $P_R$ is less than $P_L$, equation of straight line and curve for the path of the right lane, such as the slope and curvature of the left lane, is calculated (S1305).

The form of the equation of the straight line (Equation 10) and the equation of the curve (Equation 11) used in the present invention is as follows.

$$x = a + by \qquad \text{[Equation 10]}$$

$$x = c + dy + ey^2 \qquad \text{[Equation 11]}$$

Coefficients a, b, c, d, and e in Equations 10 and 11 denote the results of image recognition, where a and b are coefficients of a straight line, and c, d, and e are coefficients of a parabola.

$a^v$, $b^v$, $c^v$, $d^v$, $e^v$, which will be described later, is defined as an equation coefficient of a straight line and a curve for a path.

In the case of step S1302 in FIG. 13, since two lanes have similar shapes, an equation of a straight line and a curve for a path is calculated by calculating a median value of the reference lane among the two lanes.

In the case of a straight line, the intermediate value of the slope b of the straight line of the two lanes is set as the slope of the reference lane. This slope is set to $b^v$, and the coefficient $a^v$ for a straight line passing through the skeleton line coordinates of the lane is obtained using the least square method. At this time, the equation of a straight line of the left and right lanes can be obtained, and this is used for path generation. The coefficient of the left path straight line is $a_L^v$, and the right path straight coefficient is denoted as $a_R^v$.

In the case of the curve, the median value of the slope d of the curve of the two lanes is set as the slope $d^v$ of the reference lane. Also, an intermediate value of the curvature e of the curves of the two lanes is set as the curvature $e^v$ of the reference lane. The slope $d^v$ and the curvature $e^v$ are fixed as constant values, and the curve coefficient for a path passing through the skeleton coordinates of the lane is calculated using the least squares method. At this time, the equation of the curve of the left and right lanes can be obtained, and this is used for path generation. The coefficient of the left path curve is $c_L^v$, and the coefficient of the right path curve is denoted as $c_R^v$.

Steps S1304 and S1305 in FIG. 13 are cases in which Equation 9 is not satisfied, which means a case in which either lane is determined as the reference lane.

In the case of step S1304, the lane probability variable of the right lane is large, and the coefficients b, d, and e of the right lane are fixed as constants $b^v$, $d^v$, $e^v$ with the right lane as the reference lane. Using the least-squares method, the straight line and curve of the left lane for the path are set by obtaining the lane coefficient $a_L^v$, $c_L^v$ for the path passing through the skeleton line coordinates of the left lane.

In the case of step S1305, the lane probability variable of the left lane is large, and coefficients b, d, and e of the left lane are fixed as constant $b^v$, $d^v$, $e^v$ using the left lane as the reference lane. Using the least-squares method, the straight line and curve of the driving lane for the path are set by obtaining the lane coefficient $a_R^v$, $c_R^v$ for the path that passes through the coordinates of the skeleton line of the right lane.

The lane information for the path of the extended lane uses the lane information of the driving lane for the path generated above. By inputting the coefficient of the left driving lane and the coordinates of the skeleton line, the coefficient $b_L^v$, $d_L^v$, $e_L^v$ of the left extension lane may be calculated using the least squares method. The remaining coefficient $b_L^x$, $d_L^x$, $e_L^x$ of left extended lane are equal to the coefficient $b_L^v$, $d_L^v$, $e_L^v$ of left driving lane. By inputting the coefficient $b_R^x$, $d_R^x$, $e_R^x$ of the right driving lane and the coordinates of the skeleton line, the coefficient $a_R^x$, $c_R^x$ of the right extension lane can be calculated using the least squares method. The remaining coefficient $b_R^x$, $d_R^x$, $e_R^x$ of right extended lane are equal to the coefficient $b_R^v$, $d_R^v$, $e_R^v$ of right driving lane.

(Interlocking Method of Multi-Lane and Multi-Path when Changing Lanes)

Hereinafter, when a lane change occurs, a method of interlocking multi-lanes and multi-paths will be described.

FIGS. 14 to 17 are views continuously illustrating a state in which a subject vehicle changes a location from an initial lane to a left lane according to an embodiment of the present invention.

Figure 14:
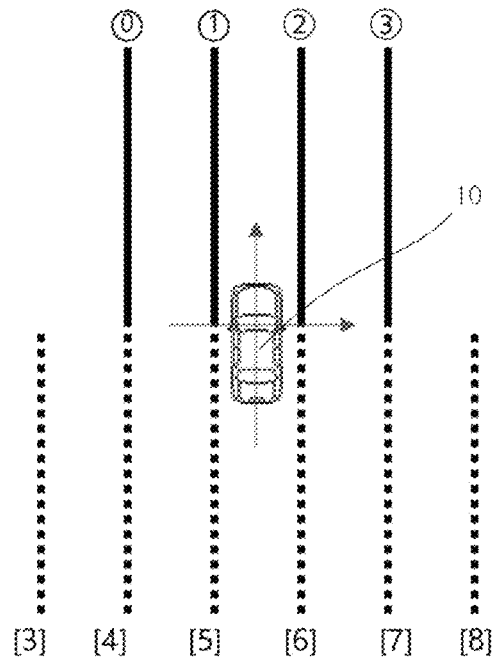
FIGS. 14 to 17 are views continuously illustrating a state in which a subject vehicle changes a location from an initial lane to a left lane according to an embodiment of the present invention.

Referring to FIG. 14, the subject vehicle 10 is in a state before changing a lane.

Figure 15:
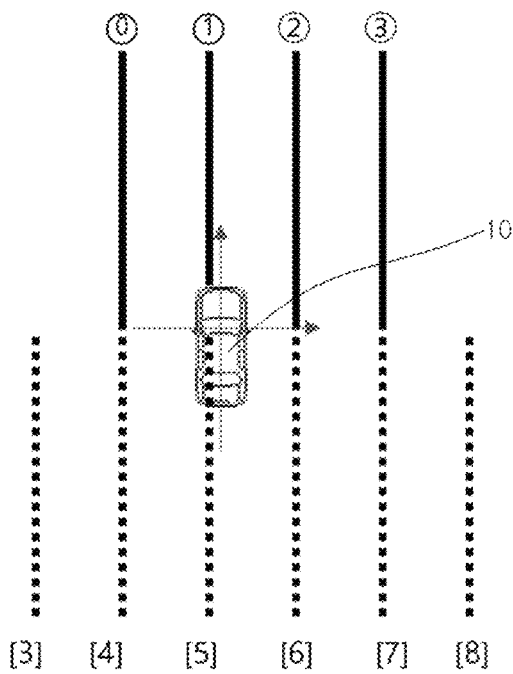

Referring to FIG. 15, the subject vehicle 10 is in a state just before changing the lane to the left, the multi-lane connection structure and the multi-path connection structure are the same as in FIG. 14. That is, the multi-lane (⓪①②③) is connected with the index of the multi-path ([4][5][6][7]).

Figure 16:
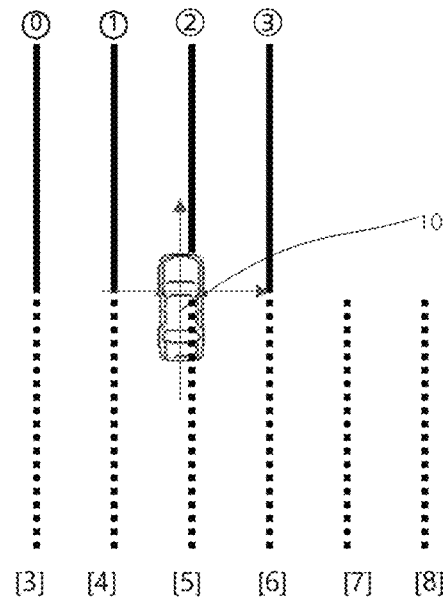

Referring to FIG. 16, the subject vehicle 10 is immediately after a lane change occurs, and at this time the multi-lane moves one step to the left, and the multi-lane (⓪①②③) is connected with the index of the multi-path ([3][4][5][6]).

Figure 17:
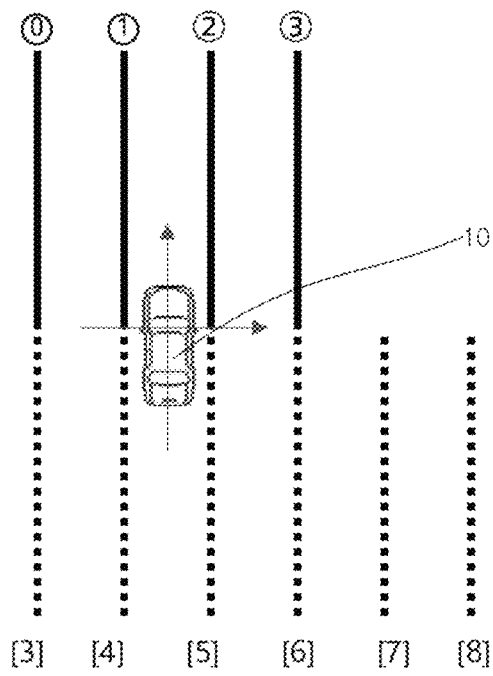

Referring to FIG. 17, the subject vehicle 10 is in a state after changing a lane.

A method of detecting a lane change is as follows.

For example, in FIGS. 14 to 17, a moment when the latest x-coordinate value of the path [5] changes from a negative number to a positive number is used as a lane change condition. This phenomenon occurs because the coordinate system used in the present invention uses the camera coordinate system (orthogonal arrow in the drawing) of the subject vehicle. In FIG. 15, the x coordinate value of the path [5] is negative, and in FIG. 16, the x coordinate value of the path [5] is positive.

Summarizing the above in a formula, it is as follows:

$$(X_{k-1}^L < 0) \cap (X_k^L > 0) \qquad \text{[Equation 12]}$$

When the condition of Equation 12 is satisfied, it may be determined that the lane has changed to the left. Here, $X_{k-1}^L$ is the X value of the left lane of the previous frame, and $X_k^L$ is the X value of the left lane of the current frame.

In the world coordinate system, (X, Y)=(0, 0) is the position of the camera installed on the subject vehicle. In other words, if the left lane is located to the left in the previous frame and to the right in the current frame of the reference value, it may be determined that the lane is changed to the left.

The following Equation 13 is a discriminant for occurrence of a lane change in the subject vehicle to the right.

$$(X_{k-1}{}^R < 0) \cap (X_k{}^R > 0) \qquad \text{[Equation 13]}$$

Here, $X_{k-1}{}^R$ is the X value of the right lane of the previous frame, and $X_k{}^R$ is the X value of the right lane of the current frame.

When the lane change of the subject vehicle occurs, the location of the multi-lane changes with respect to the path as shown in FIGS. 14 to 17. In this case, information on the multi-lane must be moved. Multi-lane information typically includes coefficients (a, b, c, d, e in Equations 10 and 11) of straight-line and curved equations.

FIGS. 18 and 19 are diagrams illustrating a method of moving multi-lane information when a subject vehicle changes lanes.

Referring to FIG. 18, when a subject vehicle changes into a left lane, a method of moving multi-lane information is shown. The circular number means the circular number of FIGS. 14 and 15. FIG. 18 is an operation performed immediately after changing into a left lane.

When explaining the meaning of each row in FIG. 18, information on the right extended lane ③ is deleted. Copy the information on the right driving lane ② to the right extension lane ③. Copy the information from the left driving lane ① to the right driving lane ②. Copy the information on the left extension lane ⓪ to the left driving lane ①. Copy the new lane information to the left extended lane ⓪.

Referring to FIG. 19, when a subject vehicle changes into a right lane, a method of moving multi-lane information is shown.

When explaining the meaning of each row in FIG. 19, information on the left extended lane ⓪ is deleted. Copy the information on the left driving lane ① to the left extension lane ⓪. Copy the information from the right driving lane ② to the left driving lane ①. Copy the information from the right extension lane ③ to the right driving lane ②. Copy the new lane information to the right extension lane ③.

(Generate Path of Subject Vehicle)

Hereinafter, a method for generating a path of a subject vehicle will be described. Since the path of the subject vehicle can be estimated using the path of the driving lane, it can be obtained using the method of creating one path of FIG. 8.

The average value of the coefficients of the equation of the driving lane is used as input information in step S801 of FIG. 8.

Equation 14 shows a method of calculating path input information of a subject vehicle.

$$a_S^v = 0 \qquad \text{[Equation 14]}$$
$$b_S^v = \frac{b_L^v + b_R^v}{2}$$
$$c_S^v = 0$$
$$d_S^v = \frac{d_L^v + d_R^v}{2}$$
$$e_S^v = \frac{e_L^v + e_R^v}{2}$$

In Equation 14, $a_S^v$ and $b_S^v$ denote a coefficient of the equation of a straight line (Equation 8), $c_S^v$, $d_S^v$, and $e_S^v$ denote a coefficient of the equation of a curve (Equation 11). $b_S^v$, $d_S^v$, and $e_S^v$ denote the slope and curvature of the path of the subject vehicle. The average value of the slope and curvature of the driving lane may be estimated as a coefficient of the equation of the path of the subject vehicle. $a_S^v$ and $c_S^v$ mean the position of the x-axis of the subject vehicle, and since the coordinate system based on the present invention is the world coordinate system with the position of the camera of the subject vehicle as the origin, $a_S^v$ and $c_S^v$ have a value of 0.

If the subject vehicle information obtained in Equation 14 is input in step S801 of FIG. 8, a path set of the subject vehicle may be obtained in step S805.

Figure 20:
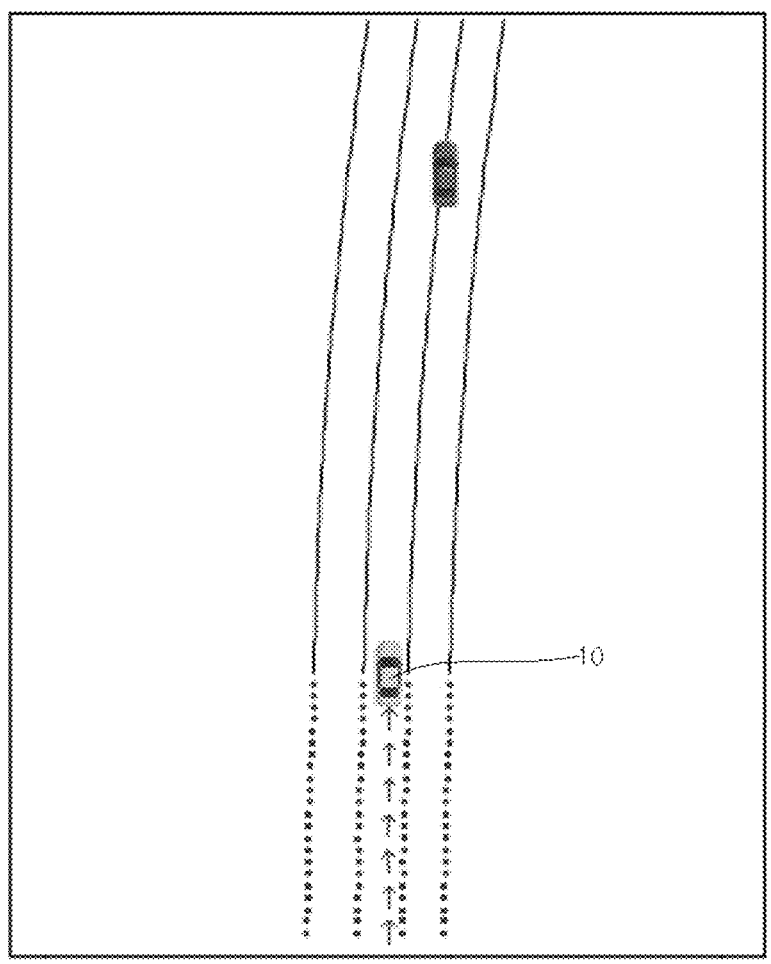
FIG. 20 is a diagram illustrating a path of a subject vehicle according to an embodiment of the present invention.

FIG. 20 is a diagram illustrating a path of a subject vehicle according to an embodiment of the present invention.

Referring to FIG. 20, the path of the subject vehicle 10 obtained by using the above-described method is shown, and arrows displayed at the lower end of the subject vehicle mean the path of the subject vehicle.

(How to Create a Path for the Front Vehicle)

Hereinafter, a method for generating a path for front vehicle will be described.

Front vehicle seen by the front camera of the subject vehicle can be recognized using a deep learning method using tensorflow. World coordinate values can be obtained with the information on the positions of the front vehicle, but these are coordinate values with the subject vehicle as the origin of the coordinate axis.

Figure 21:
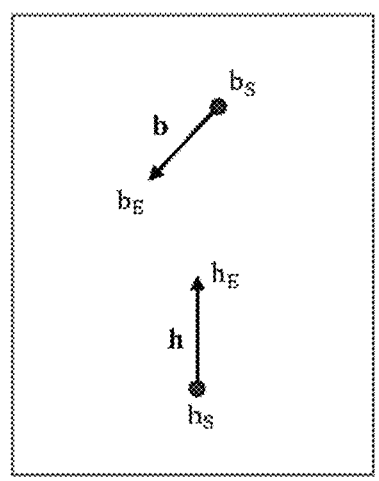
FIGS. 21 to 23 are diagrams for explaining a method for generating a path of a front vehicle using a motion vector of a subject vehicle according to an embodiment of the present invention.
Figure 22:
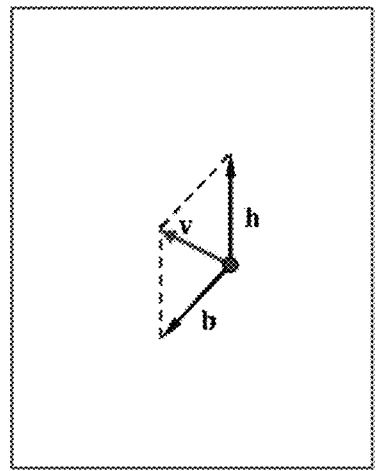
Figure 23:
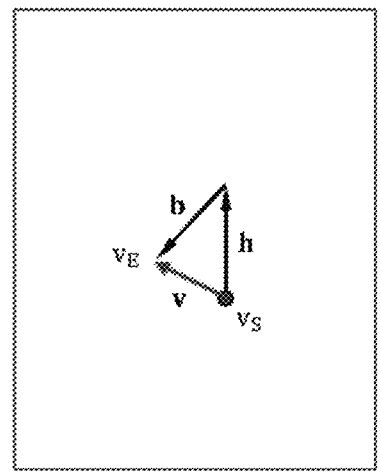

FIGS. 21 to 23 are diagrams for explaining a method for generating a path of a front vehicle using a motion vector of a subject vehicle according to an embodiment of the present invention. In order to find the path of the front vehicle, we show how to find the motion vector v of the front vehicle in the world coordinate system.

Referring to FIG. 21, when the camera coordinates of the subject vehicle are taken as the origin, the vector b means that the front vehicle moves from a specific position of the image of the previous frame to a specific position of the image of the current frame as a vector. It is the movement of the front vehicle that can be obtained only from images captured by the camera without input of other information. In other words, it has the same meaning as when there is no movement of the subject vehicle. The starting point $b_S$ of the vector b means the coordinates of the front vehicle of the previous frame, and the end point $b_E$ means the coordinates of the front vehicle of the current frame.

In FIG. 21, a vector h denotes a motion vector of a subject vehicle. The starting point $h_S$ of the vector h means the coordinates of the subject vehicle of the previous frame, and the end point $h_E$ means the coordinates of the subject vehicle of the current frame. The motion vector of the subject vehicle refers to a connection between the current coordinates and the coordinates of the previous frame in the path of the subject vehicle. A method of obtaining the path of the subject vehicle has been previously described.

Referring to FIG. 22, a state of finding a vector addition v of a vector b and a vector h is shown. In the world coordinate system, the motion vector v of the front vehicle means that the motion vector h of the subject vehicle is added to the vector b.

In the case of FIG. 22, the starting point of the vector addition v and the starting point of the vector b are the same, but the ending points $b_E$ and $v_E$ exist at different positions. Since we want to maintain the position of the end point $b_E$ (meaning the current position of the front vehicle) of the existing vector b, we use a different version of the vector addition shown in FIG. 23.

Referring to FIG. 23, using this method, the vector v maintains the current position $v_E$ of the front vehicle, and it is possible to know the position $v_S$ of the front vehicle of one frame before.

Figure 24:
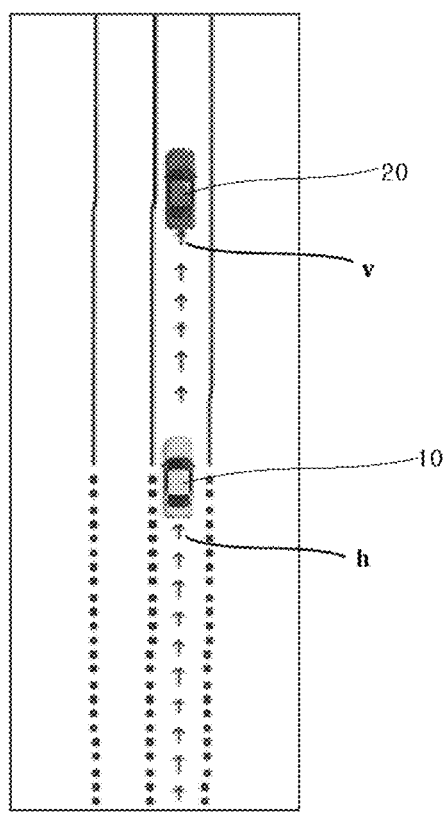
FIG. 24 is a view showing a top view by calculating a motion vector of a front vehicle according to an embodiment of the present invention.

FIG. 24 is a top view showing a motion vector of a front vehicle according to an embodiment of the present invention.

Referring to FIG. 24, a vehicle denotes the subject vehicle 10, and a motion vector h of the subject vehicle denotes a bottom arrow. The vehicle means the front vehicle 20, and the motion vector v of the front vehicle means the upper arrow.

In the embodiment, the subject vehicle and the front vehicle are moving at a constant velocity at a speed of about 70 km/h, and since the vector b has a relatively small vector quantity, the vector component of the subject vehicle is successfully applied to the vector calculation of the front vehicle. Additionally, the motion vector v denotes the instantaneous speed of the front vehicle.

The vector v of the front vehicle described above is for the current frame. The vectors $v_k$ obtained in the past time are stored in the memory in the form of a set.

Hereinafter, a method of concatenating vector sets into a path set will be described.

Figure 25:
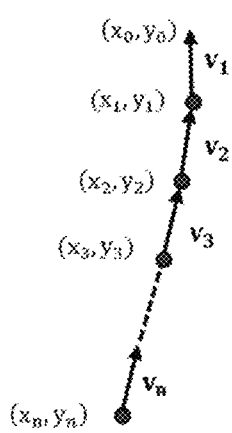
FIG. 25 is a view illustrating a general state in which vectors of a front vehicle are connected to each other to form a path set according to an embodiment of the present invention.

FIG. 25 is a view illustrating a general state in which vectors of a front vehicle are connected to each other to form a path set according to an embodiment of the present invention.

Referring to FIG. 25, since the start point of the previous vector and the end point of the current vector are always connected in the path set, coordinates are defined as $\{(x_0, y_0), (x_1, y_1), \ldots, (x_n, y_n)\}$.

The vector component of $v_1$ is $(a_1, b_1)$ and the vector component of $v_n$ is $(a_n, b_n)$.

In FIG. 25, the coordinates of the end point $v_{cE}$ of $v_2$ are the same as the coordinates of the start point $v_{1S}$ of $v_1$. If the coordinates of the starting point $v_{2S}$ of $v_2$ is $(x_2, y_2)$, the coordinates of $(x_2, y_2)$ can be obtained as in Equation 15 by subtracting the vector component $(a_2, b_2)$ from the starting point $(x_1, y_1)$ of $v_1$.

$$x_2 = x_1 - a_2$$

$$y_2 = y_1 - b_2 \quad \text{[Equation 15]}$$

If Equation 15 is expanded into a general expression that can be calculated for all path coordinates, Equation 16 is obtained.

$$x_{k+1} = x_k - a_{k+1}$$

$$y_{k+1} = y_k - b_{k+1}$$

$$1 \leq k \leq (n-1) \quad \text{[Equation 16]}$$

In Equation 16, the range of k is limited to 1 to n−1. n means the number of total vectors. Here, the starting point $(x_1, y_1)$ and the ending point $(x_0, y_0)$ of the vector $v_1$ should be input as initial values. The starting point $(x_1, y_1)$ and the ending point $(x_0, y_0)$ mean $v_S$ and $v_E$ in FIG. 23, and the method of obtaining the coordinates has been described above.

All path coordinates of the front vehicle can be obtained using the above method, and red arrows in FIG. 24 show an embodiment in which path coordinates of the front vehicle (red) are obtained.

While the present invention has been particularly shown and described with reference to preferred embodiments thereof, it will be understood by those of ordinary skill in the art that various changes in form and details may be made therein without departing from the spirit and scope of the present invention as defined by the following claims

What is claimed is:

1. A vehicle path restoration method through sequential image analysis, comprising:
   acquiring sequential images from a front camera of an image capturing unit installed in a subject vehicle;
   generating a path of the subject vehicle and a front vehicle by receiving the sequential image and performing image analysis in an image analysis unit; and
   expressing the image analysis of the image analysis unit in the form of a top view on a display unit,
   wherein the performing image analysis in the image analysis unit comprises:
     determining a lane of the current time;
     generating a multi-lane recognizable in the front camera image and a multi-path for each index calculated using geometric characteristics of the lane recognized at the current time and the speed of the subject vehicle,
     generating a path set of each index in the multi-path, wherein the generating the path set of each index in the multi-path comprises:
       receiving input information that is input data for creating the path set;
       determining whether the path is a curved lane or a straight lane;
       generating a curved path when the path is determined as the curved lane;
       generating a straight path when the path is determined as the straight lane; and
       creating a path set of the corresponding index by integrating the curved path and the straight path;
     generating path data of the subject vehicle based on the path set; and
     generating path data of the front vehicle based on the path set.

2. The vehicle path restoration method through sequential image analysis of claim 1, wherein
   the input data for creating the path set are the speed of the subject vehicle, the path index number, the equation coefficient of a straight line and the equation coefficient of the curve suitable for the lane recognized in the image, the radius of curvature, and the curve discrimination coefficient.

3. The vehicle path restoration method through sequential image analysis of claim 1, wherein
   generating the multi-path for each index includes:
   determining an index of a path connected to the lane recognized in the current frame in the front camera image as an active path index, and determining an index of a path not connected to the lane recognized in the current frame in the front camera image as an inactive path index;
   the active path index is passed to the active multi-path to generate an active multi-path; and
   the inactive path index is transferred to the inactive multi-path, and in the inactive multi-path generation, a new path is not added, but according to the movement of the subject vehicle, correcting the location of the path stored in the past time.

4. The vehicle path restoration method through sequential image analysis of claim 3, wherein the active multi-path generation is the entire process of a method of creating a path set of each individual index, and the active single path generation step is performed several times as many as the number of lanes recognized in the current image.

5. The vehicle path restoration method through sequential image analysis of claim 1, wherein
generating path data of the subject vehicle comprises:
obtaining equation coefficients of straight lines and the equation coefficients of curve of a driving lane, which are both lanes of the subject vehicle;
determining the equation coefficients of the straight line and the equation coefficients of curve for the path of the subject vehicle by using the equation coefficients of the straight line and the equation coefficients of the curve of the driving lane;
determining whether the path is the curved lane or the straight lane;
generating the curved path when the path is determined as the curved lane;
generating the straight path when the path is determined as the straight lane; and
generating the set of paths for the subject vehicle by integrating the curved path and the straight path.

6. The vehicle path restoration method through sequential image analysis of claim 5,
further comprising:
making the driving lane in a parallel state:
determining a lane probability variable that is a probability of being a lane with respect to a right lane and a left lane;
obtaining a median value of the slope and curvature of the two lane information, and calculating the equations of straight lines and curves for the path with respect to the left and right lanes when the difference between the left lane and the right lane probability variable is less than or equal to a predetermined error tolerance;
comparing the sizes of the left lane and right lane probability variables when the difference between the left and right lane probability variables is out of a predetermined error tolerance;
calculating the equations of straight lines and curves for the left-lane path, including the slope and curvature of the right-lane if the right-lane probability variable is larger than the left-lane probability variable; and
calculating the equations of straight lines and curves for the right-lane path, including the slope and curvature of the left-lane if the right-lane probability variable is smaller than the left-lane probability variable.

7. The vehicle path restoration method through sequential image analysis of claim 1, wherein
when the location of the multi-lane is changed because the subject vehicle is changed to a lane, the information of the multi-lane is moved together.

8. The vehicle path restoration method through sequential image analysis of claim 1, wherein
generating of the path data of the front vehicle includes:
determining a vector b representing that the front vehicle moves from a specific position of an image of a previous frame to a specific position of an image of a current frame when the camera coordinates of the subject vehicle are taken as the origin;
determining a motion vector h of the subject vehicle connecting the current coordinates and the coordinates of the previous frame in the path of the subject vehicle; and
obtaining a motion vector v of the front vehicle that is a vector addition of the vector b and the vector h.

* * * * *